United States Patent
Reinke et al.

(10) Patent No.: US 12,459,481 B2
(45) Date of Patent: Nov. 4, 2025

(54) DETECTING AIR IN A BRAKE MASTER CYLINDER AND BLEEDING THE BRAKE MASTER CYLINDER OF A HYDRAULIC POWER BRAKE SYSTEM

(71) Applicant: Robert Bosch GmbH, Stuttgart (DE)

(72) Inventors: Erwin Reinke, Neuenstadt Am Kocher (DE); Otmar Bussmann, Abstatt (DE); Carsten Thierer, Abstatt (DE); Kevin Wodrich, Erlenbach (DE); Ralf Kinder, Auenstein (DE); Tim-Philipp Jesse, Sachsenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 509 days.

(21) Appl. No.: 17/839,960

(22) Filed: Jun. 14, 2022

(65) Prior Publication Data

US 2023/0029398 A1    Jan. 26, 2023

(51) Int. Cl.
*B60T 17/22* (2006.01)
*B60T 8/40* (2006.01)
*B60T 13/68* (2006.01)

(52) U.S. Cl.
CPC ............ *B60T 17/22* (2013.01); *B60T 17/222* (2013.01); *B60T 8/4081* (2013.01); *B60T 13/686* (2013.01); *B60T 2270/10* (2013.01); *B60T 2270/88* (2013.01)

(58) Field of Classification Search
None
See application file for complete search history.

(56) References Cited

U.S. PATENT DOCUMENTS

2018/0111593 A1\* 4/2018 Kim .......................... B60T 8/88

FOREIGN PATENT DOCUMENTS

| CN | 109572652 A | \* | 4/2019 | ............ B60T 13/142 |
| DE | 102019201536 A1 | | 8/2020 | |
| KR | 101196281 B1 | \* | 11/2012 | |

OTHER PUBLICATIONS

CN-109572652-A—English Machine translation (Year: 2019).\*
KR101196281B1—English Machine translation (Year: 2012).\*

\* cited by examiner

*Primary Examiner* — Melanie Torres Williams
(74) *Attorney, Agent, or Firm* — NORTON ROSE FULBRIGHT US LLP

(57) ABSTRACT

In order to detect air in a brake master cylinder within a hydraulic power brake system, a brake master cylinder pressure on actuation of the brake master cylinder is compared with a comparison pressure which prevails in the brake master cylinder when it is air-free. For bleeding, brake fluid is conveyed with a power brake pressure generator through the in this case non-actuated brake master cylinder into a pressureless brake fluid reservoir, where air escapes from the brake fluid.

19 Claims, 1 Drawing Sheet

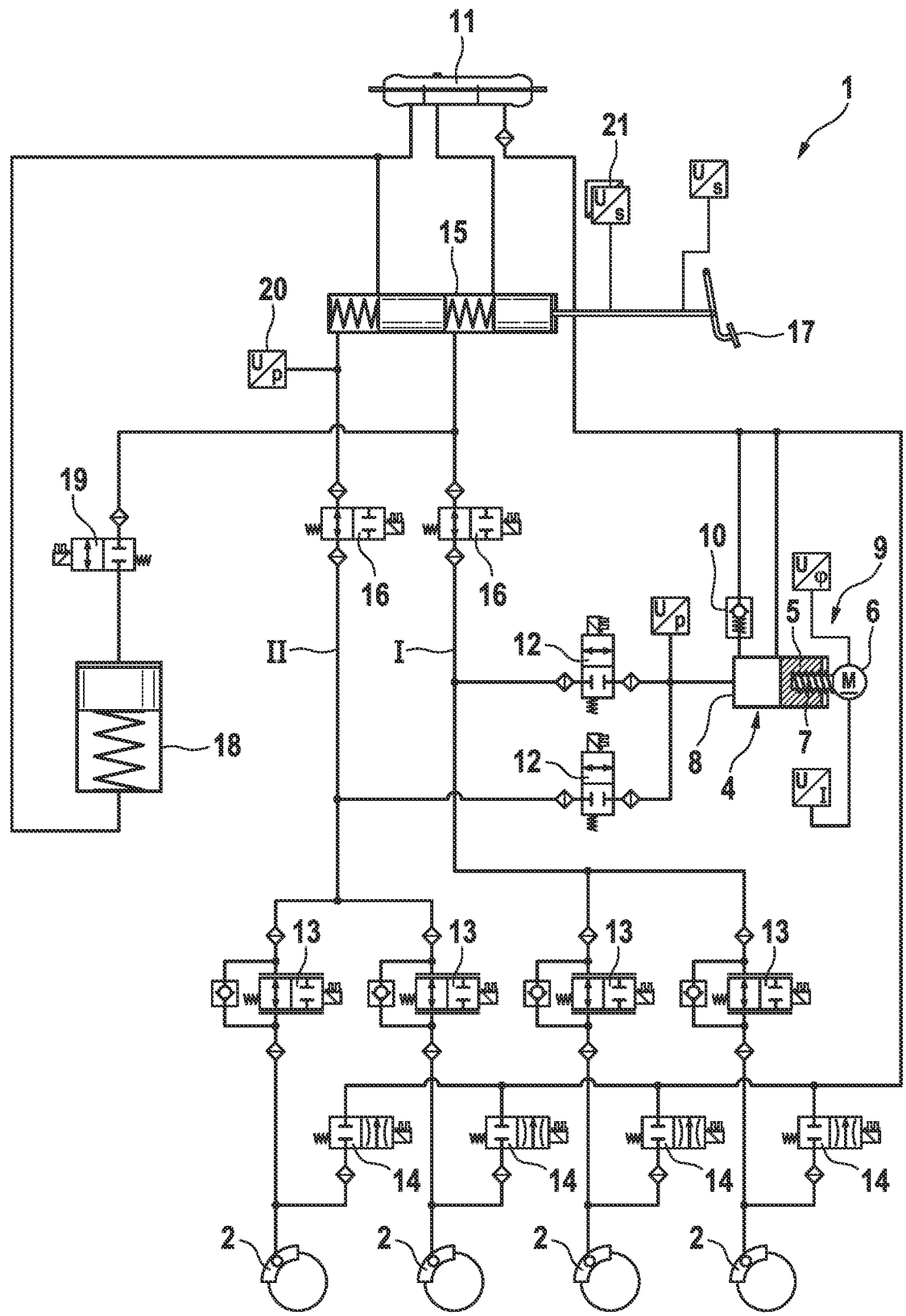

DETECTING AIR IN A BRAKE MASTER CYLINDER AND BLEEDING THE BRAKE MASTER CYLINDER OF A HYDRAULIC POWER BRAKE SYSTEM

CROSS REFERENCE

The present application claims the benefit under 35 U.S.C. § 119 of German Patent Application No. DE 10 2021 207 848.6 filed on Jul. 22, 2021, which is expressly incorporated herein by reference in its entirety.

FIELD

The present invention relates to a method for detecting air in a brake master cylinder of a hydraulic power brake system for a motor vehicle, in particular an automobile, and for bleeding the brake master cylinder.

BACKGROUND INFORMATION

German Patent Application No. DE 10 2019 201 536 A1 describes a hydraulic power brake system with a brake master cylinder actuatable by muscle power to which hydraulic wheel brakes are connected via isolation valves in each brake circuit. A power brake pressure generator with a piston-cylinder unit is connected by power valves to the brake circuits. By closing a test valve, which is arranged between a pressureless brake fluid reservoir and the brake master cylinder, and actuating the power brake pressure generator, it is possible to establish whether a medium in the brake master cylinder is compressible, i.e., whether a brake fluid in the brake master cylinder contains air.

SUMMARY

A method according to the present invention makes it possible to detect air in a brake master cylinder of a hydraulic power brake system without a test valve, the present invention not excluding a test valve. The power brake system is provided for a motor vehicle, in particular for an automobile having for example four hydraulic wheel brakes. The power brake system has a brake master cylinder and a brake fluid reservoir, with which, as is conventional, the brake master cylinder communicates in the non-actuated state. Actuating the brake master cylinder hydraulically isolates the brake master cylinder from the brake fluid reservoir, for example by a brake master cylinder piston passing over, and in this manner closing, a compensating bore, through which the brake master cylinder communicates with the brake fluid reservoir, or by closing a central valve in the brake master cylinder piston on actuation of the brake master cylinder. A pressure sensor capable of measuring a brake master cylinder pressure, i.e., a pressure prevailing in the brake master cylinder, is connected to the brake master cylinder. One or more brake circuits are connected to the brake master cylinder via an isolation valve, preferably in each brake circuit. The brake circuits in turn have one or more hydraulic wheel brakes, which may for example also be connected to the brake circuits by inlet valves of a slip control system of the power brake system.

Apart from the brake master cylinder, the power brake system has a power brake pressure generator to which the brake circuit or brake circuits is/are connected by power valves.

Brake pressure for actuating the power brake system or the wheel brakes during service braking is generated by the power brake pressure generator. The power valves are opened in order to connect the brake circuits hydraulically to the power brake pressure generator, and the isolation valves are closed in order to hydraulically isolate the brake master cylinder from the brake circuits. Actuating the brake master cylinder hydraulically isolates the brake master cylinder as described from the brake fluid reservoir. A brake master cylinder pressure generated in the brake master cylinder on actuation of the brake master cylinder which is hydraulically isolated by the closed isolation valves from the brake circuits of the power brake system is measured with the pressure sensor and, according to the present invention, compared with a comparison value for brake master cylinder pressure which prevails in the actuated brake master cylinder when it is air-free. If the brake master cylinder pressure is lower than the comparison value, a medium in the brake master cylinder is compressible and it may be assumed that, in addition to brake fluid, air is present in the brake master cylinder. A profile of brake master cylinder pressure on actuation of the brake master cylinder may also be compared with a profile of the comparison value for brake master cylinder pressure on actuation of the brake master cylinder with an air-free brake master cylinder. According to the present invention, air in the brake master cylinder is in particular assumed when a difference between the measured brake master cylinder pressure and the comparison value for brake master cylinder pressure exceeds a predefinable difference.

In the event of auxiliary braking on failure of the power brake pressure generator, the power brake system is actuated with a brake pressure which is generated with the brake master cylinder. In this case, the isolation valves connecting the brake master cylinder to the brake circuits of the power brake system are or have been opened and the power valves closed, in order to hydraulically isolate the power brake pressure generator from the brake circuits.

Further developments and advantageous refinements of the present invention are disclosed herein.

In order to bleed the brake master cylinder, i.e., to remove any air possibly present in the brake master cylinder, the method according to an example embodiment of the present invention provides conveying brake fluid with the power brake pressure generator through the brake master cylinder into the brake fluid reservoir. To this end, the power valve and the isolation valve of a brake circuit are opened in order to connect the brake master cylinder to the power brake pressure generator. The brake master cylinder is not actuated during bleeding, such that it communicates with the brake fluid reservoir. Air-free brake fluid from the power brake pressure generator displaces brake fluid present in the brake master cylinder into the brake fluid reservoir, any air possibly present in the brake master cylinder likewise passing into the brake fluid reservoir where it escapes from the brake fluid.

The brake circuits of the power brake system are preferably bled separately from one another. It is, however, also possible to simultaneously bleed all or a plurality of brake circuits, for which purpose the power valves and the isolation valves in the relevant brake circuits are opened.

In accordance with an example embodiment of the present invention, the method can also be carried out irrespective of the presence of air in the brake master cylinder, namely without establishing whether air is present in the brake master cylinder. In this case, the method is carried out occasionally on a precautionary basis.

All the features disclosed in the description and the FIGURE can be implemented in embodiments of the present invention individually by themselves or, in principle, in any desired combination. Embodiments of the present invention which do not include all but rather only one or more features of an embodiment of the present invention are in principle possible.

BRIEF DESCRIPTION OF THE DRAWINGS

The present invention is explained in greater detail below on the basis of a hydraulic power brake system depicted in the FIGURE.

The FIGURE shows a hydraulic circuit diagram of the power brake system.

DETAILED DESCRIPTION OF EXAMPLE EMBODIMENTS

The hydraulic power brake system 1 depicted in the FIGURE is provided for an automobile with four hydraulic wheel brakes 2. It takes the form of a dual-circuit brake system with two wheel brakes 2 in each case connected to a brake circuit I, II.

For power braking, the power brake system 1 has a piston-cylinder unit 4, the piston 5 of which is displaceable in a cylinder 8 with an electric motor 6 via a screw drive 7 as rotation/translation conversion mechanism. The electric motor 6, the screw drive 7 and the piston-cylinder unit 4 form a power brake pressure generator 9 of the power brake system 1 for generating brake pressure for brake actuation with power. Power braking, for which brake pressure is generated with the power brake pressure generator 9, is the conventional and intended brake actuation, i.e., service braking.

The power brake pressure generator 9, i.e., the cylinder 8 of the piston-cylinder unit 4 of the power brake pressure generator 9, is connected by a nonreturn valve 10 to a pressureless brake fluid reservoir 11 and, via a power valve 12 in each brake circuit I, II, which are hydraulically connected in parallel with one another, the wheel brakes 2 are connected to the cylinder 8 of the piston-cylinder unit 4 of the power brake pressure generator 9.

For each wheel brake 2, the brake system 1 has an inlet valve 13 and an outlet valve 14 with which wheel brake pressures in each wheel brake 2 are individually controllable. In each brake circuit I, II, the wheel brakes 2 are in each case connected by one inlet valve 13 and by the isolation valve 16 to the brake master cylinder 16 and by the inlet valve 13 and by the power valve 12 to the cylinder 8 of the power brake pressure generator 9. The wheel brakes 2 are connected by the outlet valves 14 to the pressureless brake fluid reservoir 11. Using the inlet valves 13, the outlet valves 14 and the power brake pressure generator 9, wheel brake pressures in the wheel brakes 2 and thus braking forces of the wheel brakes 2 are controllable without slip in normal driving operation. Slip control systems such as antilock and traction control systems or vehicle dynamics control systems, which are also colloquially known as antiskid control systems, automatic braking, distance control systems and the like are moreover possible. Such control systems are conventional and are not described here in greater detail. In each brake circuit I, II, two inlet valves 13 are connected hydraulically in parallel by a power valve 12 to the power brake pressure generator 9.

In addition to the power brake pressure generator 9, the brake system 1 has a dual-circuit brake master cylinder 15 actuatable by muscle power which communicates with the pressureless brake fluid reservoir 11—in the exemplary embodiment without an interposed valve—and to which the wheel brakes 2 in each brake circuit I, II are connected by an isolation valve 16 and two inlet valves 13. The brake master cylinder 15 acts as a setpoint encoder for the wheel brake pressures to be established in the wheel brakes 2. On power braking, the brake pressure is generated with the power brake pressure generator 9 which is connected to the brake circuits I, II by opening the power valves 12. On power braking, the brake master cylinder 15 is hydraulically isolated from the brake circuits I, II or from the wheel brakes 2 by closing the isolation valves 16. In the event of failure of the power brake pressure generator 9, the brake pressure is generated by actuating the brake master cylinder 15 with muscle power ("auxiliary braking").

So that brake fluid can be displaced from the brake master cylinder 15 and pistons of the brake master cylinder 15 and a brake pedal 17 can be moved when the isolating valves 16 are closed, the power brake system 1 has a pedal travel simulator 18 which is connected in a brake circuit I via a simulator valve 19 to the brake master cylinder 15. The pedal travel simulator 18 is a piston-cylinder unit with a spring-loaded piston.

In the described and depicted embodiment of the present invention, the inlet valves 13 and the isolation valves 16 are 2/2-way solenoid valves which are open in their deenergized basic positions, and the power valves 12 of the power brake pressure generator 9, the outlet valves 14 and the simulator valve 19 are 2/2-way solenoid valves which are closed in their deenergized basic positions. In order to improve the control quality of a slip control system, the inlet valves 13 in the exemplary embodiment take the form of proportional valves.

On actuation of the brake master cylinder 15, its pistons pass over compensating bores, by which the brake master cylinder 15 communicates with the brake fluid reservoir 11, whereby the brake master cylinder 15 is hydraulically isolated from the pressureless brake fluid reservoir 11. The isolation valves 16 are closed, whereby the brake master cylinder 15 is hydraulically isolated from the brake circuits I, II, and the power valves 12 are opened, whereby the brake circuits I, II and the wheel brakes 2 are connected to the cylinder 8 of the power brake pressure generator 9. The brake pressure for actuating the power brake system 1 is generated with the power brake pressure generator 9. On actuation, the brake master cylinder 15 can also be hydraulically isolated from the brake fluid reservoir 11 in another manner. For example, pistons of the brake master cylinder 15 may have "central valves" which close automatically in the event of movement of the pistons of the brake master cylinder 15.

According to the present invention, in order to detect air in the brake master cylinder 15, a pressure sensor 20 connected to the brake master cylinder 15 in a brake circuit II is used to measure a brake master cylinder pressure, i.e. a pressure in the brake master cylinder 15, as a function of pedal travel of the brake pedal 17, which is measured with a travel sensor 21, or of piston travel of a piston of the brake master cylinder 15. An additional second, redundant travel sensor is depicted in the drawing. The brake master cylinder pressure is compared with a comparison value which is the brake master cylinder pressure at the respective pedal or piston travel when the brake master cylinder 15 exclusively contains brake fluid and no air. If there is air in the brake master cylinder 15, the compressibility of air means that the brake master cylinder pressure is significantly and detectably lower at identical pedal or piston travel than when the brake master cylinder 15 exclusively contains brake fluid. It is also possible to compare a profile of brake master cylinder pressure on actuation of the brake master cylinder 15 as a function of pedal or piston travel with a profile of the comparison value. If the brake master cylinder pressure is lower than the comparison value, the brake master cylinder 15 contains air or in any event a compressible medium or a medium with greater compressibility than brake fluid.

The simulator valve 19 preferably is or remains closed for the measurement, such that the brake master cylinder 15 is hydraulically isolated from the pedal travel simulator 18 and no brake fluid can be displaced from the brake master cylinder 15 into the pedal travel simulator 18. It is, however, also possible to measure the brake master cylinder pressure with an open simulator valve 19. In this case, the comparison value is the brake master cylinder pressure in the case of an air-free brake master cylinder 15 with a pedal travel simulator 18 connected by the open simulator valve 19.

Measurement according to the present invention of the brake master cylinder pressure and comparison with the comparison value may proceed on each actuation of the brake master cylinder 15, the simulator valve 19 preferably being open during measurement in this case. The measurement according to the present invention may also proceed only occasionally, for example at defined time intervals, according to defined criteria or for example on actuation of the brake master cylinder 15 when the motor vehicle is at a standstill. In this case, the simulator valve 19 can remain closed during measurement, which improves measurement quality because any elasticity of the pedal travel simulator 18 has no effect.

If the brake master cylinder 15 contains air, it is bled according to the present invention by conveying brake fluid with the power brake pressure generator 9 through the brake master cylinder 15 into the pressureless brake fluid reservoir 11. The brake master cylinder 15 is not or has not been actuated at this point so that it communicates with the pressureless brake fluid reservoir 11. The power valves 12 and the isolation valves 16 are open/opened while the brake master cylinder 15 is being bled in order to connect the brake master cylinder 15 with the cylinder 8 of the piston-cylinder unit 4 of the power brake pressure generator 9. The inlet valves 13 are closed so that no brake fluid is conveyed into the wheel brakes 2. Brake fluid flowing out of the power brake pressure generator 9 into the brake master cylinder 15 displaces the brake fluid present in the brake master cylinder 15 into the brake fluid reservoir 11. If the brake fluid in the brake master cylinder 15 contains air, the air passes with the brake fluid into the brake fluid reservoir 11, where it escapes from the brake fluid.

In order to convey the brake fluid out of the cylinder 8 of the piston-cylinder unit 4 of the power brake pressure generator 9 through the non-actuated brake master cylinder 15 with the open power valve 12 and open isolation valve 16, the piston 5 of the piston-cylinder unit 4 of the power brake pressure generator 9 is moved by means of the electric motor 6 via the screw drive 7 in a direction, here denoted conveying stroke, in the cylinder 8 in such a way that the piston 5 displaces brake fluid from the cylinder 8. The displaced brake fluid flows through the non-actuated brake master cylinder 15 into the pressureless brake fluid reservoir 11, which is here also denoted conveying brake fluid from the power brake pressure generator 9 through the brake master cylinder 15 into the brake fluid reservoir 11. After the conveying stroke, the piston 5 is moved in a reverse stroke in the opposite direction in the cylinder 8, the power valves 12 being or having been closed, such that brake fluid is aspirated from the brake fluid reservoir 11 through the nonreturn valve 10 into the cylinder 8 of the power brake pressure generator 9. The method can be repeated a number of times.

Brake circuits I, II can be simultaneously bled by opening the power valves 12 and the isolation valves 16 and closing the inlet valves 13. The two brake circuits I, II are preferably bled separately from one another or in succession by opening the power valve 12 and the isolation valve 16 of the brake circuit I, II to be bled and closing the power valve 12 and the isolation valve 16 of the other brake circuit II, I. The inlet valves 13 of the brake circuit I, II to be bled or all the inlet valves 13 can be closed.

The brake master cylinder 15 can also be bled according to the present invention without prior testing for the presence of air in the brake master cylinder 15. If the brake master cylinder 15 is not actuated, brake fluid can occasionally be conveyed with the power brake pressure generator 9 through the brake master cylinder 15 into the brake fluid reservoir 11 in order to bleed the brake master cylinder 15 in case it contains air.

What is claimed is:

1. A method for a hydraulic power brake system, the hydraulic power brake system including a brake master cylinder, a brake fluid reservoir with which the brake master cylinder communicates in a non-actuated state and does not communicate in an actuated state, a pressure sensor, a power brake pressure generator, an isolation valve via which the brake master cylinder is connected to a brake circuit of the power brake system, and a power valve via which the power brake pressure generator is connected to the brake circuit of the power brake system, the method comprising:
    measuring, on actuation of the brake master cylinder and using the pressure sensor, a brake master cylinder pressure;
    comparing the measured brake master cylinder pressure with a comparison value for brake master cylinder pressure which prevails in the actuated brake master cylinder when it is air-free; and
    in response to a deviation of the measured master cylinder pressure from the comparison value, bleeding the brake master cylinder in a state of the hydraulic power brake system in which the brake master cylinder is non-actuated, the isolation valve is open, and the power valve is open, the bleeding being performed by the power brake pressure generator conveying brake fluid through the brake master cylinder into the brake fluid reservoir.

2. The method as recited in claim 1, wherein the isolation valve is closed during the measurement of the brake master cylinder pressure.

3. The method as recited in claim 1, wherein a pedal travel simulator is connected via a simulator valve to the brake master cylinder, the simulator valve being closed during the measurement of the brake master cylinder pressure.

4. The method as recited in claim 1, wherein a hydraulic wheel brake is connected by the isolation valve to the brake master cylinder and by the power valve to the power brake pressure generator.

5. The method as recited in claim 1, wherein the power brake system has a slip control system with an inlet valve and an outlet valve for a hydraulic wheel brake, the wheel brake being connected by the inlet valve and the isolation valve to the brake master cylinder and by the inlet valve and the power valve to the power brake pressure generator, and wherein the inlet valve is closed during the bleeding of the brake master cylinder.

6. The method as recited in claim 1, wherein the power brake pressure generator has a piston-cylinder unit, a piston of the piston-cylinder unit, in order to convey the brake fluid through the brake master cylinder into the brake fluid reservoir, displaces the brake fluid in a conveying stroke from a cylinder of the piston-cylinder unit through the open power valve, through the open isolation valve and through the non-actuated brake master cylinder into the brake fluid reservoir, and wherein, on a subsequent reverse stroke, the piston of the piston-cylinder unit, with the isolation valve and/or the power valve being closed, aspirates the brake fluid from the brake fluid reservoir into the cylinder of the piston-cylinder unit.

7. The method as recited in claim 6, wherein the steps of the method is repeated.

8. A method for a hydraulic power brake system, the hydraulic power brake system including a brake master cylinder, a brake fluid reservoir with which the brake master cylinder communicates in a non-actuated state and does not communicate in an actuated state, a power brake pressure generator, an isolation valve via which the brake master cylinder is connected to a brake circuit of the power brake system and a power valve via which the power brake pressure generator is connected to the brake circuit of the power brake system, the method comprising:
periodically bleeding the brake master cylinder by:
placing the hydraulic power brake system into a state in which the brake master cylinder is non-actuated, the isolation valve is open, and the power valve is open; and
conveying, by the power brake pressure generator, brake fluid through the brake master cylinder into the brake fluid reservoir.

9. The method as recited in claim 8, wherein a hydraulic wheel brake is connected by the isolation valve to the brake master cylinder and by the power valve to the power brake pressure generator.

10. The method as recited in claim 8, wherein the power brake system has a slip control system with an inlet valve and an outlet valve for a hydraulic wheel brake, the hydraulic wheel brake being connected by the inlet valve and the isolation valve to the brake master cylinder and by the inlet valve and the power valve to the power brake pressure generator, and wherein the inlet valve is closed during the bleeding of the brake master cylinder.

11. The method as recited in claim 8, wherein the power brake pressure generator has a piston-cylinder unit, a piston of the piston-cylinder unit, in order to convey the brake fluid through the brake master cylinder into the brake fluid reservoir, displaces the brake fluid in a conveying stroke from a cylinder of the piston-cylinder unit through the open power valve, through the open isolation valve and through the non-actuated brake master cylinder into the brake fluid reservoir, and wherein, on a subsequent reverse stroke, the piston of the piston-cylinder unit, with the isolation valve and/or the power valve being closed, aspirates the brake fluid from the brake fluid reservoir into the cylinder of the piston-cylinder unit.

12. A hydraulic power brake system comprising:
a brake master cylinder;
a brake fluid reservoir with which the brake master cylinder communicates in a non-actuated state and does not communicate in an actuated state;
a power brake pressure generator;
an isolation valve via which the brake master cylinder is connected to a brake circuit of the power brake system; and
a power valve via which the power brake pressure generator is connected to the brake circuit of the power brake system;
wherein:
the hydraulic power brake system is configured to bleed the brake master cylinder either:
periodically; or
in response to a determined deviation of a measured master cylinder pressure from a comparison value for brake master cylinder pressure that prevails in the brake master cylinder when the brake master cylinder is actuated and air-free, the measured master cylinder pressure being obtained by using a pressure sensor of the hydraulic power brake system to measure the brake master cylinder pressure on actuation of the brake master cylinder; and
the bleeding of the brake master cylinder is performed by:
placing the hydraulic power brake system into a state in which the brake master cylinder is non-actuated, the isolation valve is open, and the power valve is open; and
conveying, by the power brake pressure generator, brake fluid through the brake master cylinder into the brake fluid reservoir.

13. The hydraulic power brake system as recited in claim 12, wherein the bleeding is performed in response to the determined deviation.

14. The hydraulic power brake system as recited in claim 13, wherein the isolation valve is closed during a measurement during which the measured master cylinder pressure is obtained.

15. The hydraulic power brake system as recited in claim 13, wherein a pedal travel simulator is connected via a simulator valve to the brake master cylinder, the simulator valve being closed during a measurement during which the measured master cylinder pressure is obtained.

16. The hydraulic power brake system as recited in claim 12, wherein the bleeding is performed periodically irrespective of whether presence of air is detected.

17. The hydraulic power brake system as recited in claim 12, further comprising:
a hydraulic wheel brake connected by the isolation valve to the brake master cylinder and by the power valve to the power brake pressure generator.

18. The hydraulic power brake system as recited in claim 12, further comprising:
a hydraulic wheel brake; and
a slip control system with an inlet valve and an outlet valve, the hydraulic wheel brake being connected by the inlet valve and the isolation valve to the brake master cylinder and by the inlet valve and the power valve to the power brake pressure generator, wherein the inlet valve is closed during the bleeding of the brake master cylinder.

19. The hydraulic power brake system as recited in claim 12, wherein:
the power brake pressure generator has a piston-cylinder unit;
a piston of the piston-cylinder unit, in order to convey the brake fluid through the brake master cylinder into the brake fluid reservoir, displaces the brake fluid in a conveying stroke from a cylinder of the piston-cylinder unit through the open power valve, through the open isolation valve, and through the non-actuated brake master cylinder into the brake fluid reservoir; and on a reverse stroke that follows the conveying stroke, the piston of the piston-cylinder unit, with the isolation valve and/or the power valve being closed, aspirates the brake fluid from the brake fluid reservoir into the cylinder of the piston-cylinder unit.

\* \* \* \* \*